(12) United States Patent
Handlogten et al.

(10) Patent No.: US 8,218,551 B2
(45) Date of Patent: *Jul. 10, 2012

(54) HIERARCHICAL SCHEDULING

(75) Inventors: Glen H. Handlogten, Rochester, MN (US); David A. Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2488 days.

This patent is subject to a terminal disclaimer.

(21) Appl. No.: 10/676,153

(22) Filed: Sep. 30, 2003

(65) Prior Publication Data

US 2005/0071504 A1 Mar. 31, 2005

(51) Int. Cl.
*H04L 12/56* (2006.01)
(52) U.S. Cl. .................... 370/395.42; 709/239
(58) Field of Classification Search ............ 370/395.2, 370/395.21, 395.3, 395.4, 395.41, 395.42, 370/395.43, 468, 230.1, 230, 235, 236.1, 370/104; 709/239
See application file for complete search history.

(56) References Cited

U.S. PATENT DOCUMENTS

| | | | |
|---|---|---|---|
| 5,850,399 A | 12/1998 | Ganmukhi et al. | |
| 6,272,109 B1 * | 8/2001 | Pei et al. | 370/230 |
| 6,396,843 B1 | 5/2002 | Chiussi et al. | |
| 6,438,134 B1 | 8/2002 | Chow et al. | |
| 6,560,230 B1 | 5/2003 | Li et al. | |
| 7,020,161 B1 * | 3/2006 | Eberle et al. | 370/468 |
| 2004/0081157 A1 * | 4/2004 | Hassan-Ali et al. | 370/395.1 |
| 2004/0081167 A1 * | 4/2004 | Hassan-Ali et al. | 370/395.42 |

OTHER PUBLICATIONS

Charny, A. et al, "Algorithms for Providing Bandwidth and Delay Guarantees in Input-Buffered Crossbars with Speedip", Quality of Service 1998 (IWQQS 98). 1998 Sixth International Workshop on Napa, CA., USA, May 18-20, 19998, New York, NY, USA, IEEE, US, May 18, 1998, pp. 235-244.
Loannou, A. et al, "Pipelined Heap (Priority Queue) Management for Advanced Scheduling in High-Speed Networks", ICC 2001, 2001 IEEE International Conference on Communications, Conference Record, Helsinky, Finland, Jun. 11-14, 2001, IEEE International Conference on Communications, New York, NY, USA, vol. 1, of 10, Jun. 11, 2001, pp. 2043-2047.

* cited by examiner

*Primary Examiner* — Seema Rao
*Assistant Examiner* — Henry Baron
(74) *Attorney, Agent, or Firm* — Dugan & Dugan PC (57) ABSTRACT

In a first aspect of the invention, a first method is provided for hierarchical scheduling. The first method includes the steps of (1) receiving data from one or more pipes, each pipe including a plurality of pipe flows (2) selecting a winning pipe from the one or more pipes from which to transmit data based upon one or more quality of service parameters corresponding to the winning pipe (3) selecting a pipe flow from the plurality of pipe flows included in the winning pipe based upon one or more quality of service parameters corresponding to the selected pipe flow and (4) transmitting data from the selected pipe flow. Numerous other aspects are provided.

19 Claims, 4 Drawing Sheets

HIERARCHICAL SCHEDULING

CROSS REFERENCE TO RELATED APPLICATION

The present application is related to U.S. patent application Ser. No. 10/675,677, filed Sep. 30, 2003 and titled "HIERARCHICAL SCHEDULING", which is hereby incorporated by reference herein in its entirety.

FIELD OF THE INVENTION

The present invention relates generally to network processors, and more particularly to methods and apparatus for hierarchical scheduling.

BACKGROUND

A network processor may be coupled to one or more network devices, such as a computer, through the network processor's input ports. Each output port of the network processor is connected to a network of limited system bandwidth. Only a certain amount of data may be transmitted by that network at one time.

To ensure access to the network, consumers are willing to purchase access to a portion of the system bandwidth from the owner thereof. Therefore, the owner of the system bandwidth may divide the system bandwidth into portions and sell the portions to one or more consumers. Typically, a purchaser of a portion of the system bandwidth does not use all of their purchased portion of the system bandwidth all of the time. Consequently, in order to increase revenues, the owner of the system bandwidth will typically sell more system bandwidth than may be available at any one time (i.e., will oversubscribe). If a consumer wants to use his full purchased portion of system bandwidth, he may temporarily use excess bandwidth (e.g., bandwidth that has been purchased by another consumer but is not in use at that moment). However, when many consumers are attempting to use all or a large portion of their purchased bandwidth at the same time, the availability of bandwidth is unpredictable. Some consumers may be allowed to use their full purchased portion of system bandwidth, while other consumers may only be allowed to use a portion of their purchased bandwidth.

Therefore, an improved system of providing access to a limited system bandwidth is needed.

SUMMARY OF THE INVENTION

In a first aspect of the invention, a first method is provided for hierarchical scheduling. The first method includes the steps of (1) receiving data from one or more pipes, each pipe including a plurality of pipe flows (2) selecting a winning pipe from the one or more pipes from which to transmit data based upon one or more quality of service parameters corresponding to the winning pipe (3) selecting a pipe flow from the plurality of pipe flows included in the winning pipe based upon one or more quality of service parameters corresponding to the selected pipe flow and (4) transmitting data from the selected pipe flow.

In a second aspect of the invention, a second method is provided for hierarchical scheduling. The second method includes the steps of (1) receiving data identifying a pipe flow, the pipe flow included in a pipe (2) writing data (e.g., event data) regarding the pipe to a first calendar (3) writing data (e.g., event data) regarding the pipe flow to a second calendar (4) scanning the first calendar for a winning pipe (5) scanning the second calendar for a winning pipe flow (6) writing the winning pipe flow to a corresponding pipe queue (7) using the winning pipe to select a pipe flow from a corresponding pipe queue; and (8) transmitting data from the selected pipe flow. Numerous other aspects are provided, as are systems and apparatus in accordance with these other aspects of the invention.

Other features and aspects of the present invention will become more fully apparent from the following detailed description, the appended claims and the accompanying drawings.

DETAILED DESCRIPTION

Figure 1:
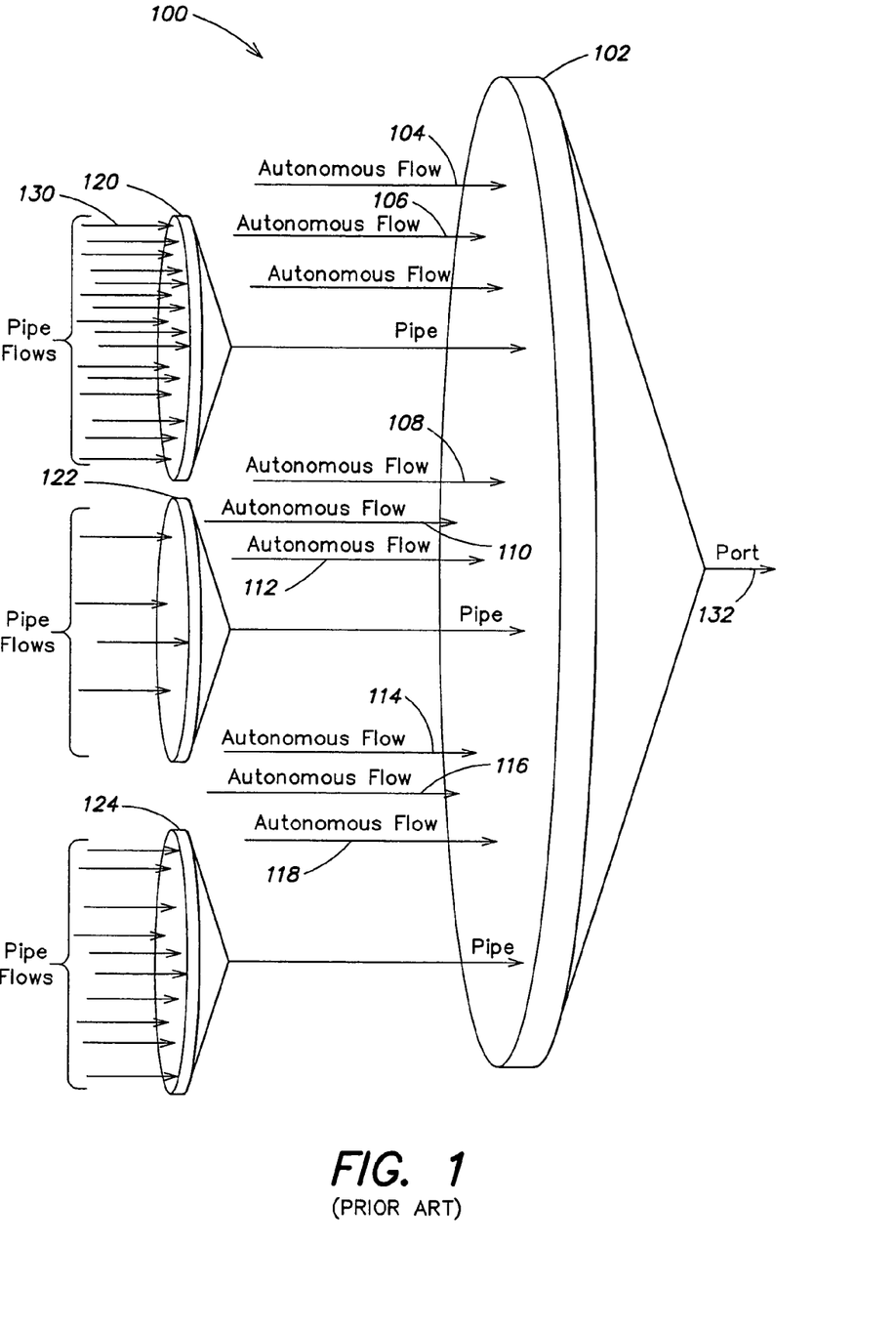
FIG. 1 is an exemplary schematic diagram of a conventional network processor system.

FIG. 1 is an exemplary schematic diagram of a conventional network processor system 100. The network processor system 100 may include a network processor 102. The network processor 102 may receive data from autonomous flows 104-118 or pipes 120, 122, 124. Autonomous flows and pipes are peers (e.g., compete equally for system bandwidth). Each autonomous flow 104, 106, 108, 110, 112, 114, 116, 118 represents an individual connection from the network processor 102 to another network device (not shown). Each pipe 120, 122, 124 may include one or more pipe flows 130. A pipe flow 130 represents an individual connection from the network processor 102 to another network device (not shown) that is grouped together with other individual connections to network devices to form a pipe 120, 122, 124 (e.g., an Internet Service provider may purchase a pipe containing pipe flows from the owner of the system bandwidth, and sell the individual pipe flows to consumers).

In the conventional network processor system 100 shown in FIG. 1, the network processor 102 receives data from a plurality of autonomous flows 104-118 and from a plurality of pipes 120, 122, 124, which each include a plurality of pipe flows (e.g., 130). The received data is to be transmitted from the same output port 132. Each output port 132 (only one output port 132 shown) of the network processor 102 is connected to a network connection of limited system bandwidth. Therefore, data from all autonomous flows and pipes may not be serviced at the same time (i.e., data from each autonomous flow or pipe may not be transmitted at the same time). In the conventional network processor 102 shown in FIG. 1, every autonomous flow 104-118 or pipe 120-124 may be assigned a priority, for example, high, medium, or low priority, and a bandwidth. The priority assigned to an autonomous flow or pipe determines how frequently the autonomous flow or pipe will be serviced. The bandwidth assigned to the autonomous flow or pipe determines the portion of the system bandwidth that is made available to the autonomous flow or pipe when it is serviced.

The conventional network processor system 100 shown in FIG. 1 may use a separate calendar for each priority type to schedule autonomous flows and/or pipes to be serviced (e.g., a high priority calendar, a medium priority calendar and a low priority calendar). Each such calendar includes a group of memory addresses that will be checked repeatedly for entries identifying autonomous flows or pipes that need to be serviced. Alternatively, a single calendar may include entries identifying autonomous flows and/or pipes of one or more priority types. A different group or area of memory addresses of the calendar may be used to store entries identifying autonomous flows and/or pipes of each priority type. Each of these groups will be checked repeatedly to identify entries that need servicing. When a group of memory addresses is checked repeatedly, a pointer, which points to a first memory address in the group during a first time unit, may be advanced during each successive time unit to point to a next memory address in the group. If the last address of the calendar is checked during the time unit, during the next time unit, the first address of the calendar may be checked. Accordingly, for convenience the calendars herein are shown schematically as a single box and referred to in the singular, although it will be understood that a calendar may comprise either a single calendar containing a plurality of priorities, or a set of calendars, preferably each containing only a single priority.

The greater the distance between the memory address of a scheduled entry in a calendar and the memory address currently being checked in the calendar, the longer the autonomous flow or pipe identified by that scheduled calendar entry must wait to be serviced. The data received by the network processor 102 may be used to identify an autonomous flow or pipe that corresponds to the data. Based upon previously-assigned priorities and bandwidths, the network processor 102 may determine an appropriate memory address in the calendar for the autonomous flow or pipe.

When a network processor system 100 includes a plurality of calendars, each of which is of a different priority type, an entry from the low priority calendar that identifies an autonomous flow or pipe that needs to be serviced during a time unit (e.g., during a scheduling opportunity) will not be selected as a winner and serviced until entries in the high and/or medium priority calendars that identify an autonomous flow or pipe that needs to be serviced during that time unit have been serviced. Likewise, an entry in the medium priority calendar that identifies an autonomous flow or pipe that needs to be serviced during a time unit will not be selected as a winner and serviced until any entries in the high priority calendar that identify an autonomous flow or pipe that need to be serviced during that time unit have been serviced.

In the conventional network processor system of FIG. 1, if an autonomous flow has been identified to be serviced, the data received from the autonomous flow is transmitted from the output port 132. In contrast, because a pipe includes one or more pipe flows, an additional lookup must be performed when a calendar identifies a pipe that needs to be serviced. The network processor must maintain a table for each pipe that includes every pipe flow included in the pipe. Each table indicates the last pipe flow that was serviced from the table. When the calendar identifies the pipe that needs to be serviced, a lookup in the table corresponding to the identified pipe is performed and the next pipe flow in the table will be serviced.

Figure 2:
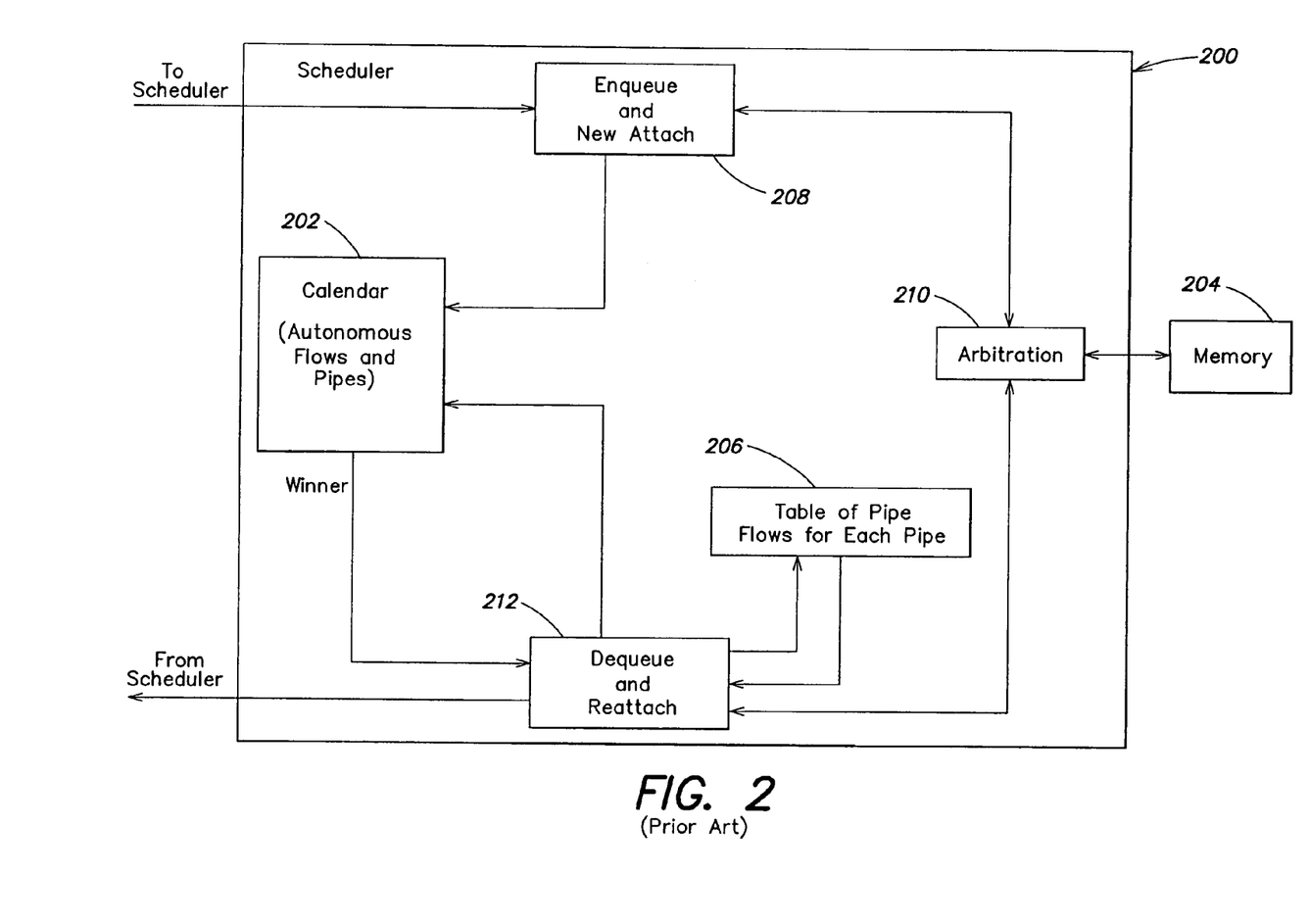
FIG. 2 is a block diagram of scheduler logic included in the conventional network processor system of FIG. 1.

FIG. 2 is a block diagram of a scheduler logic 200 included in the conventional network processor system 100 of FIG. 1. The scheduler logic 200 may be used by the conventional network processor system 100 to schedule autonomous flows or pipes to be serviced. The scheduler logic 200 may include a main calendar 202 (which may include one or more calendars of various priorities). The main calendar 202 may be coupled to a memory 204 (e.g., via enqueue and new attach logic 208 and an arbitration unit 210) and to a table 206 of pipe flows for each pipe (e.g., via dequeue and reattach logic 212). The arbitration unit 210 arbitrates reads from and writes to the memory 204. For example, the enqueue and new attach logic 208 may receive data that identifies a pipe. The enqueue and new attach logic 208 may access the memory 204 (e.g., via the arbitration unit 210) and determine the pipe identified by the received data is of a low priority and is assigned a certain bandwidth. Based upon this information, the enqueue and new attach logic 208 will determine an appropriate address of the main calendar 202 in which to write an entry identifying the pipe corresponding to the received data and will write the identifying entry therein (i.e., will schedule the pipe to be serviced).

When an entry is written into the main calendar 202, it may be written into a location of the main calendar 202 as a single entry. The entry written into the calendar may be a pointer to a control structure (described in detail below) that corresponds to an autonomous flow or pipe (a pipe in this example). However, for convenience, the entry in the calendar will be referred to as the autonomous flow or pipe itself rather than as a pointer to a control structure.

The main calendar 202 will check its memory addresses for entries identifying a pipe or autonomous flow that needs to be serviced, as described above when discussing the operation of calendars. When the main calendar 202 reaches the entry identifying the pipe corresponding to the data received during a time unit, the main calendar 202 will select that pipe entry to be serviced (i.e., will select that pipe as a winner) assuming no higher-priority entries from the calendar need to be serviced during that time unit.

As mentioned above, because a pipe includes one or more pipe flows, an additional lookup must be performed when the main calendar 202 identifies a pipe that needs to be serviced during the time unit. Therefore, when the main calendar 202 identifies a low priority pipe that needs to be serviced (i.e., selects a winner) assuming no higher priority pipes need to be serviced during the same time unit, the scheduler logic 200 (e.g., via dequeue and reattach logic 212) performs a lookup in a table 206 which lists pipe flows for each pipe. The scheduler logic 200 thus looks up a table of pipe flows that corresponds to the identified pipe. The table indicates the next pipe flow to be serviced. That pipe flow will be serviced (i.e., data from that pipe flow will be transmitted from the output port 132 of the network processor system 100).

The conventional network processor system 100 does not provide a means to distinguish between the pipe flows included in a pipe. Each pipe flow is serviced one time before any pipe flow is serviced a second time. Consequently, the conventional network processor system 100 provides uniformly slow transmissions for both high and low priority flows. However, because pipe flows may include data of varying size and importance, a network administrator may desire to service a first pipe flow multiple times before a second pipe flow is serviced once. The network administrator may also desire to use a large bandwidth when servicing the first pipe flow and a small bandwidth when servicing the second pipe flow.

The present invention introduces methods and apparatus for hierarchical scheduling that distinguishes between pipe flows in a pipe and will be described below with reference to FIGS. 3-4.

Figure 3:
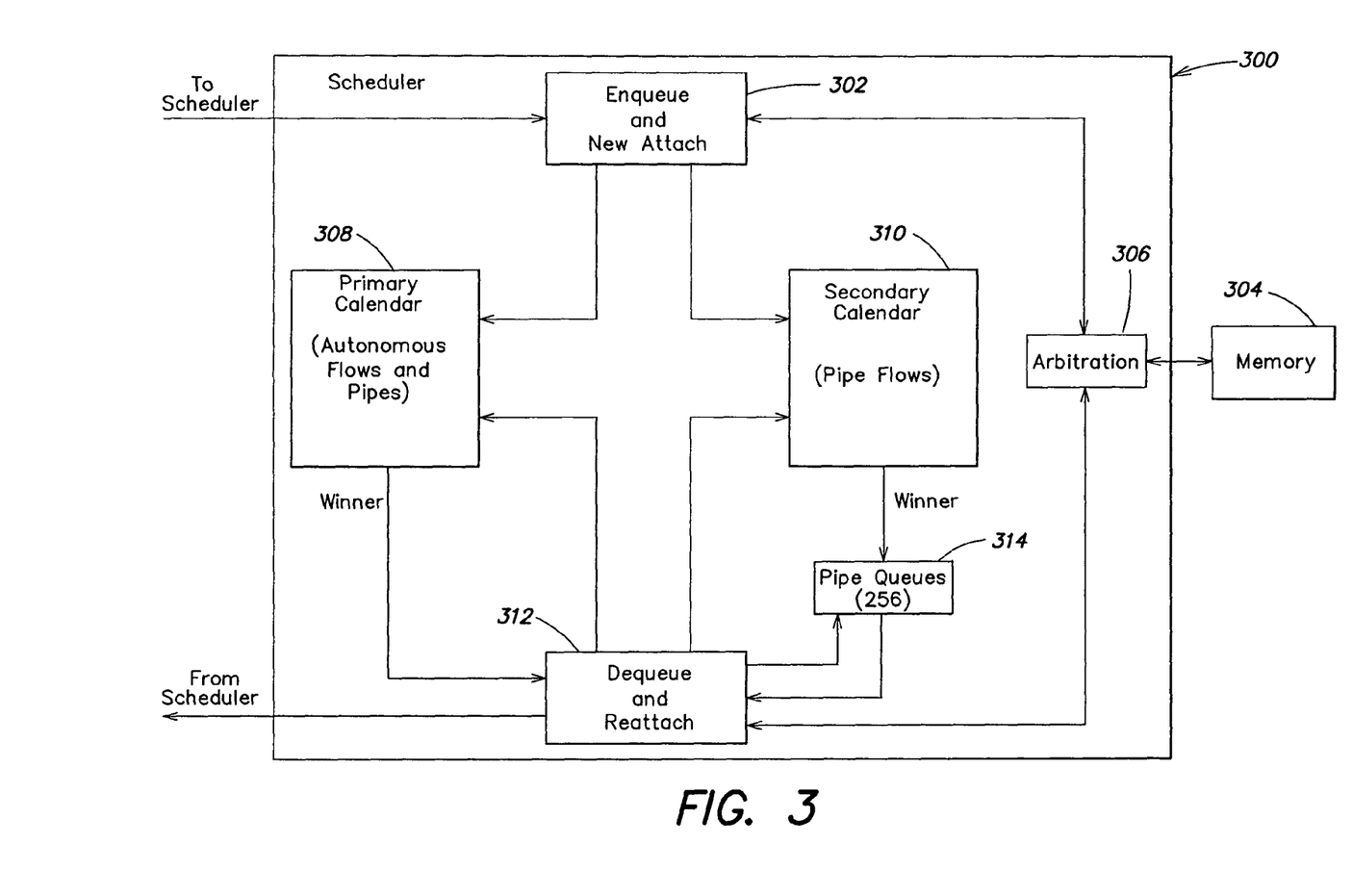
FIG. 3 is a block diagram of exemplary scheduler logic in which the present invention for hierarchical scheduling may be implemented.

FIG. 3 is a block diagram of exemplary scheduler logic 300 in which the present inventive methods and apparatus for hierarchical scheduling may be implemented. The exemplary scheduler logic 300 may be included in a network processor system (e.g., a network processor system similar to the conventional network processor system shown in FIG. 1). As in the conventional network processor system 100, the network processor system (not shown) that includes the inventive scheduler logic 300 may receive data from autonomous flows and/or pipes. The autonomous flows and pipes are peers. Each pipe may include one or more pipe flows. In contrast to the conventional network processor system 100, the scheduler logic 300 includes a secondary calendar 310 which is used to schedule pipe flows and a pipe queue table 314 which may include one or more pipe flows corresponding to a given pipe. The secondary calendar 310 and the pipe queue table 314 will be described in detail below.

The scheduler logic 300 includes enqueue and new attach logic 302, which is coupled to a memory 304 (e.g., via an arbitration unit 306). As in the conventional scheduler logic 200, the arbitration unit 306 arbitrates writes to and reads from the memory 304. The enqueue and new attach logic 302 may receive data which identifies a flow (e.g., an autonomous flow or a pipe flow). As in the memory 204 of the conventional scheduler logic 200 shown in FIG. 2, the memory 304 of the scheduler logic 300 may be configured to store a priority and bandwidth for each autonomous flow or pipe. In addition, the memory 304 may store a priority and bandwidth for each pipe flow that may be included in each pipe.

The memory 304 may also be used to store information describing the structure of a queue (e.g., information describing the structure of a queue of data frames or cells received from a flow). The priority and bandwidth information corresponding to an autonomous flow, pipe, and/or pipe flow stored in the memory 304 may be provided by a user, such as a network administrator, during system initialization, for example.

Based on the flow (i.e., autonomous flow or pipe flow) identified by the data, the enqueue and new attach logic 302 retrieves priority and bandwidth information corresponding to the identified flow and processes the data differently depending on whether it is an autonomous flow or a pipe flow as is described under the subheadings below.

The Flow Identified by the Data Corresponds to an Autonomous Flow

If the received data identifies an autonomous flow, priority and bandwidth information corresponding to that autonomous flow is retrieved from the memory 304. The enqueue and new attach logic 302 determines whether an entry exists in the primary (or main) calendar 308 for the autonomous flow identified by the data. As previously noted, although only a single primary calendar 308 is shown in the scheduler logic 300 of FIG. 3, additional calendars that correspond to different priority types may exist. If an entry exists in the primary calendar 308 for the identified autonomous flow, the enqueue and new attach logic 302 will not write an entry in the primary calendar 308. If an entry does not exist in the primary calendar 308 for the autonomous flow, data regarding the autonomous flow is written into the primary calendar 308. Similar to the main calendar 202 of the conventional scheduler logic 200, the primary calendar 308 includes groups of memory addresses (e.g., in one or more calendars) that will be checked repeatedly for entries identifying autonomous flows or pipes that need to be serviced.

The scheduler logic 300 handles the scheduling of autonomous flows in a manner similar to that used by the conventional scheduler logic 200. The enqueue and new attach logic 302 determines an appropriate memory address in the calendar for the autonomous flow. For example, if the autonomous flow is of a low priority, it will be placed in a low priority portion of the primary calendar 308. Further, if the autonomous flow is a new entry to the low-priority portion of the primary calendar, it will be placed near the memory address currently being checked in that low-priority portion of the primary calendar. The greater the distance between the memory address of a scheduled entry and the memory address of the calendar currently being checked, the longer the autonomous flow or pipe identified by that scheduled calendar entry must wait to be serviced. The primary calendar may identify an entry that needs servicing from each priority group during a time unit. Thereafter, from the identified entries the primary calendar selects a winner to be serviced during the time unit. Alternatively, a separate calendar may be used for each priority type to schedule autonomous flows and/or pipes to be serviced (e.g., a high priority calendar, a medium priority calendar and a low priority calendar). Each such calendar includes a group of memory addresses that will be checked repeatedly for entries identifying autonomous flows or pipes that need to be serviced. Accordingly, for convenience the calendars herein are shown schematically as a single box and referred to in the singular, although it will be understood that a calendar may comprise either a single calendar containing a plurality of priorities, or a set of calendars, preferably each containing only a single priority. In the above example, if a separate primary calendar is used for each priority type, the enqueue and new attach logic 302 determines a suitable memory address in an appropriate primary calendar for the autonomous flow. Each primary calendar may identify an entry that needs servicing during the time unit. The entry that needs servicing from the highest-priority primary calendar is selected as a winner to be serviced during the time unit.

The primary calendar 308 may be coupled to dequeue and reattach logic 312. The primary calendar 308 notifies the dequeue and reattach logic 312 regarding the selected winner. If the winner is an autonomous flow, the data received from the autonomous flow will be transmitted from the output port 132 using the bandwidth assigned to that autonomous flow.

Like the enqueue and new attach logic 302, the dequeue and reattach logic 312 may be coupled to the memory 304 (e.g., via the arbitration unit 306). The dequeue and reattach logic 312 may retrieve from the memory 304 priority and bandwidth information corresponding to the autonomous flow selected as the winner. The dequeue and reattach logic 312 will reattach (e.g., rewrite) the autonomous flow entry in an appropriate memory address of the primary calendar 308 based upon the retrieved information to schedule the autonomous flow to be serviced again.

The Flow Identified by the Data Corresponds to a Pipe Flow

As mentioned above, the scheduler logic 300 includes enqueue and new attach logic 302, which is coupled to a memory 304. The enqueue and new attach logic 302 may receive data which identifies a flow (e.g., an autonomous flow or pipe flow). If the data received by the enqueue and new attach logic 302 identifies a pipe flow, priority and bandwidth information corresponding to that pipe flow may be retrieved from the memory 304. The enqueue and new attach logic 302 may also retrieve priority and bandwidth information corresponding to a pipe that includes the pipe flow from the memory 304. As mentioned above, the enqueue and new attach logic 302 may be coupled to the primary calendar 308.

The enqueue and new attach logic 302 determines whether an entry exists in the primary calendar 308 for the pipe corresponding to the pipe flow identified by the received data. If such an entry does not exist within the primary calendar 308, data regarding the pipe is written into the primary calendar 308 in a manner similar to that of the autonomous flow. The primary calendar functions as described above to select from the identified entries a winner to be serviced. Specifically, the primary calendar 308 may be coupled to dequeue and reattach logic 312, and may notify the dequeue and reattach logic 312 regarding the selected winner.

The enqueue and new attach logic 302 may be coupled to a secondary calendar 310 that contains pipe flows that were previously scheduled to be serviced. Therefore, unlike the process for autonomous flows, when a pipe flow is identified by the received data the secondary calendar 310 is checked. The enqueue and new attach logic 302 determines whether an entry exists in the secondary calendar 310 for the pipe flow identified by the received data. If not, data regarding the pipe flow is written into the secondary calendar 310. Like the primary calendar, the secondary calendar 310 may include priority groups of memory addresses (e.g., in one or more calendars) that will be checked repeatedly for entries identifying pipe flows that need to be serviced. The secondary calendar may identify during a time unit an entry that needs servicing during the time unit from each priority group. Thereafter, from the identified entries the secondary calendar selects a winner to be serviced during the time unit.

The secondary calendar 310 may be coupled to a pipe queue table 314 (e.g., a memory) that may store one or more (e.g., 256) pipe queues. Each pipe queue includes one or more entries of pipe flows. The secondary calendar 310 notifies the pipe queue table 314 of the winner selected from the secondary calendar 310. The pipe queue table 314 places the selected winner, which is a pipe flow, on a queue for the pipe that includes the pipe flow.

The pipe queue table 314 is coupled to the dequeue and reattach logic 312. When the dequeue and reattach logic 312 is notified of the winner (which is assumed to be a pipe in this example) from the primary calendar, the dequeue and reattach logic 312 will select a pipe flow from a queue in the pipe queue table 314 that corresponds to the winning pipe from the primary calendar 308. The dequeue and reattach logic 312 will transmit data received from that pipe flow through the output port 132 of the network processor system (not shown) using the bandwidth assigned to that pipe flow.

The dequeue and reattach logic 312 may be coupled to the memory 304 (e.g., via the arbitration unit 306). The dequeue and reattach logic 312 may retrieve priority and bandwidth information corresponding to the pipe flow that was selected as a winner from the secondary calendar 310. So that the pipe flow that was selected as a winner may be scheduled to be serviced again, the dequeue and reattach logic 312 will reattach the pipe flow entry in an appropriate memory address of the secondary calendar 310 based upon the retrieved information. Similarly, the dequeue and reattach logic 312 may retrieve priority and bandwidth information corresponding to the pipe that was selected as a winner from the primary calendar 308 and reattach the pipe entry in an appropriate memory address of the primary calendar 308 based upon the retrieved information.

It should be noted that the enqueue and new attach logic 302 and the dequeue and reattach logic 312 may include logic devices, such as an application specific integrated circuit, a programmable logic circuit, or similar standard logic. The primary calendar 308, secondary calendar 310, and the pipe queue table 314 may include an on-chip memory, such as an SRAM or the like. Other memory, such as an off-chip memory may be used. The memory 304 may be an external memory such as a DRAM or the like, for example.

The operation of the scheduler logic 300 is now described with reference to FIGS. 3 and 4, which illustrate an exemplary method for hierarchical scheduling of data received from a flow. For convenience, it is assumed that all data is received from pipe flows. However, it should be noted that the method of hierarchical scheduling may be used on a network processor system that receives data from pipe flows and/or autonomous flows. The method for scheduling of autonomous flows was discussed above and may be performed according to conventional methods and therefore will not be repeated.

Figure 4:
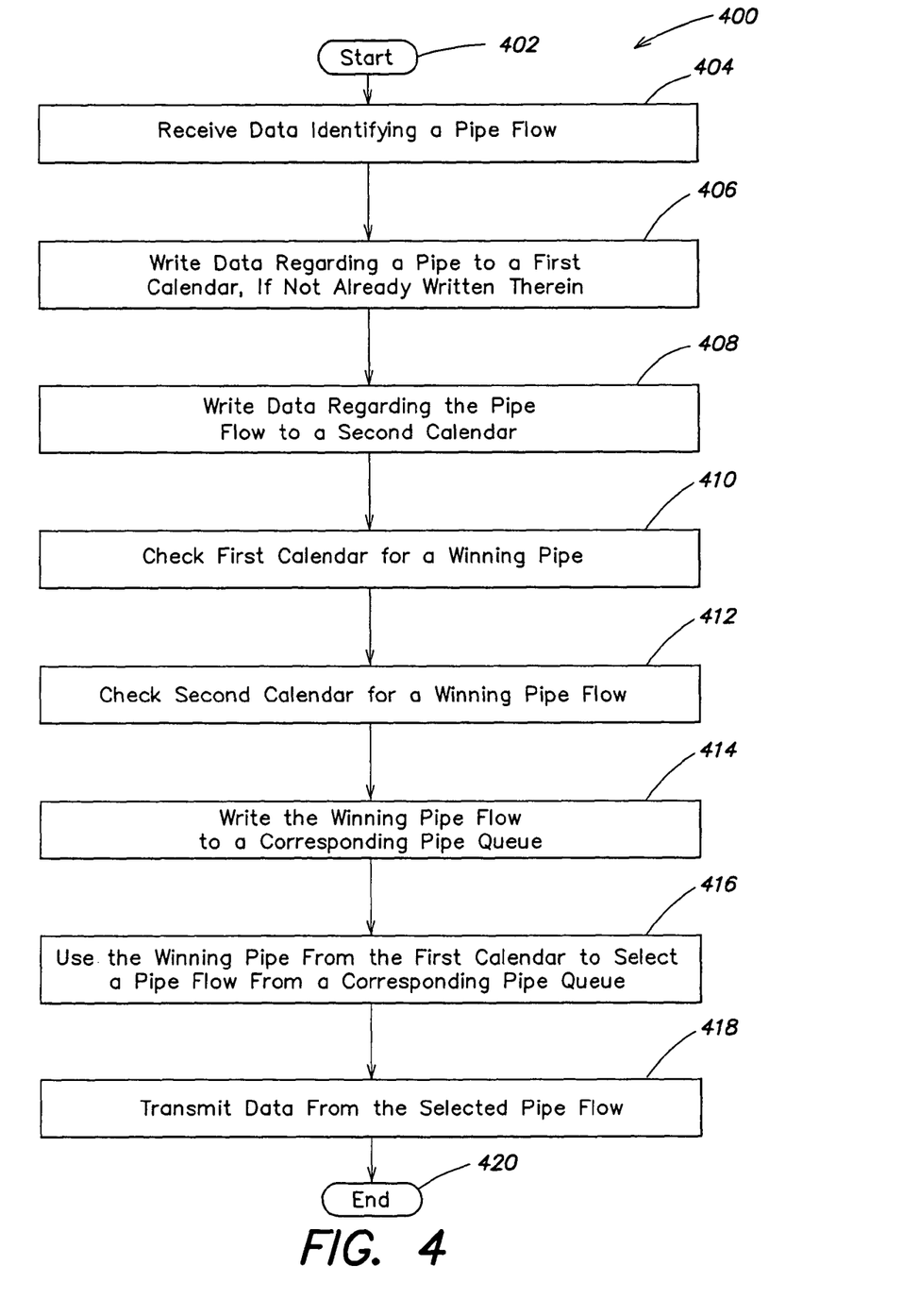
FIG. 4 illustrates an exemplary method for hierarchical scheduling of data received from a flow.

With reference to FIGS. 3 and 4, in step 402 the method of hierarchical scheduling of data received from a flow begins. In step 404, data identifying a pipe flow is received. For example, the enqueue and new attach logic 302 of the scheduler logic 300 may receive data identifying a flow. The data may include a size of a frame or cell received in a flow, and a pointer to the frame or cell received in a flow.

The enqueue and new attach logic 302 will retrieve information stored as Quality of Service (QoS) parameters from the memory 304, such as priority and bandwidth information, which corresponds to the flow identified by the received data. As mentioned above, in this example it is assumed the received data identifies a pipe flow. The memory 304 may include a control structure (e.g., a control block) for each flow (e.g., autonomous flow and/or pipe flow) that may be received by the network processor system (not shown). The control block for each autonomous flow and/or pipe flow may include values for one or more priority parameters and one or more bandwidth parameters. The priority parameters define how frequently a pipe flow will be serviced. The bandwidth parameters define the portion of the system bandwidth that will be made available to the pipe flow when the pipe flow is chosen to be serviced.

The enqueue and new attach logic 302 will retrieve from the memory 304 information stored as Quality of Service (QoS) parameters, such as, priority and bandwidth information, which corresponds to the pipe that includes the pipe flow identified by the received data. In addition to including control structures (e.g., control blocks) that include pipe bandwidth and priority parameters, the memory 304 may include one or more control structures that include values for Quality of Service (QoS) parameters, such as priority and bandwidth parameters, for each pipe.

The enqueue and new attach logic 302 determines whether an entry exists in the primary (first) calendar 308 for the pipe corresponding to the pipe flow identified by the received data. If an entry for the pipe exists in the first calendar 308, the pipe has already been scheduled to be serviced and the enqueue and new attach logic 302 does not need to write data regarding the pipe in the first calendar 308. However, if an entry for the pipe does not exist in step 406, the enqueue and new attach logic 302 will write data regarding the pipe to the first calendar 308.

The enqueue and new attach logic 302 determines whether an entry exists in the secondary (second) calendar 310 for the pipe flow identified by the received data. If an entry for the pipe flow exists, the pipe flow has already been scheduled to be serviced and the enqueue and new attach logic 302 does not need to write data regarding the pipe flow in the second calendar 310. However, if an entry for the pipe flow does not exist, in step 408, the enqueue and new attach logic 302 will write data regarding the pipe flow in an appropriate address of the second calendar 310. This data will include a pointer to information about the pipe that includes the pipe flow. For example, if the pipe flow is of a high priority, it will be placed in a high priority portion of the secondary calendar 310. Further, if the pipe flow is a new entry to the high priority portion of the secondary calendar 310, it will be placed near the memory address currently being checked in that high priority portion of the secondary calendar 310, so that the pipe flow will be serviced more quickly.

In step 410, the first calendar 308 is checked for a winning pipe. The primary calendar may identify an entry from each priority portion of the primary calendar to be serviced during a time unit (e.g., one or more clock cycles). The primary calendar selects a winner (e.g., an entry to be serviced) from the entries identified to be serviced during the time unit. In this example, the winning entry is assumed to correspond to a pipe. The primary calendar 308 notifies the dequeue and reattach logic 312 of the winning pipe, for example, via a bus.

In step 412, the secondary calendar 310 is independently checked for any winning pipe flow. More specifically, the secondary calendar may identify an entry that needs servicing from each priority group during the time unit. The secondary calendar selects a winner from the identified entries to be serviced during the time unit. In one embodiment, four priority types may be used to schedule the pipes and flows received by the network processing system, therefore, the secondary calendar 310 may be divided into four groups. Each of these groups or areas will be checked repeatedly. Other numbers of priority types may be used. The secondary calendar 310 may identify an entry from each of these groups or areas (e.g., identify a high priority pipe flow, a medium priority pipe flow and a low priority pipe flow to be serviced). During each clock cycle of the network processor (not shown) that includes the scheduler logic 300, one of the entries identified by the secondary calendar will be selected as a winning entry (e.g., as an entry to be serviced). The winning entry corresponds to a pipe flow. The secondary calendar 310 notifies the pipe queue table 314 of the winning pipe flow via a bus, for example.

In step 414, the winning pipe flow is written into a corresponding pipe queue. More specifically, the pipe queue table 314 may receive information about the winning pipe flow and the pipe that includes the winning pipe flow. The pipe queue table 314 may retrieve priority and bandwidth information corresponding to that pipe flow from the memory 304. Entries in each queue may be arranged in priority order. If two or more entries have the same priority, those entries may be arranged by the length of time each entry has been stored in the queue. Based upon the information received from the secondary calendar 310 and the information retrieved from the memory 304, the winning pipe flow from the secondary calendar 310 will be placed in one of the queues stored in the pipe queue table 314. More specifically, the winning pipe flow entry will be placed in a queue for the pipe that includes the winning pipe flow.

The placement of the winning pipe flow entry in the pipe queue may be determined by the information retrieved from the memory 304. For example, if the pipe queue previously contained an entry for a high priority pipe flow, followed by an entry for a medium priority pipe flow, followed by an entry for a low priority pipe flow, and the winning pipe flow is of a high priority, the entry for the winning pipe would be inserted in the pipe queue before the medium priority pipe flow entry and after previously existing high priority pipe flow entry.

In step 416, the winning pipe from the first calendar 308 is used to select a pipe flow from a corresponding pipe queue. As mentioned above, the primary calendar 308 notifies the dequeue and reattach logic 312 of the winning pipe. The dequeue and reattach logic 312 may determine whether the pipe queue (stored in the pipe queue table 314) that corresponds to the winning pipe is empty (i.e., the pipe queue does not include any pipe flows that need to be serviced during the time unit). The steps performed when the pipe queue that corresponds to the winning pipe is empty include novel aspects of the present invention and will be described later.

In this example, it is assumed that the pipe queue that corresponds to the winning pipe is not empty. The dequeue and reattach logic 312 will select a pipe flow entry from the pipe queue (stored in the pipe queue table 314) that corresponds to the winning pipe. More specifically, the dequeue and reattach logic 312 will select from the pipe queue, the highest priority pipe flow entry that has been in the queue for the longest time, as the pipe flow entry to be serviced.

In step 418, data from the selected pipe flow is transmitted. A frame or cell received by the network processor system (not shown) from the selected pipe flow will be transmitted through the output port of the network processor system. Other numbers of frames or cells may be transmitted through the output port of the network processor system. In step 420, assuming there is no additional data for the selected pipe flow, the method of FIG. 4 ends. Otherwise the process proceeds as described below.

If there is additional data for the selected pipe flow, the dequeue and reattach logic 312 determines additional data (e.g., frames or cells) identifying the selected pipe flow needs to be serviced. To make this determination the dequeue and reattach logic 312 will access the information stored in memory describing the structure of a queue. If additional data identifying the selected flow needs to be serviced, the dequeue and reattach logic 312 will retrieve priority and bandwidth information corresponding to that pipe flow from the memory 304. Based upon that information, the dequeue and reattach logic 312 may determine an appropriate memory address in the secondary calendar 310 in which to reattach (i.e., rewrite) the selected pipe flow entry so that the selected pipe flow may be scheduled to be serviced again.

For example, assuming the selected pipe flow is of a high priority, the pipe flow is written into the high priority portion of the secondary calendar 310. Because the pipe flow was just serviced, the memory address selected in the high priority portion of the secondary calendar may be a greater distance from the memory address currently being checked in the high priority group than when the pipe flow was initially attached (e.g., written) to the secondary calendar 310. Therefore, the pipe flow may have to wait a longer time to be serviced after it is reattached to the secondary calendar 310 than when it is initially attached to the secondary calendar 310.

Alternatively, if the dequeue and reattach logic 312 determines that all data has been transmitted and the flow is empty, the selected pipe flow will not be reattached to the secondary calendar 310.

The dequeue and reattach logic 312 may determine whether the selected pipe is empty (i.e., no received data that needs to be serviced during this time unit identifies a pipe flow included in the selected pipe) by accessing information describing the structure of a queue for each pipe flow included in the selected pipe, which is stored in the memory 304. If additional data identifying a flow that is included in the selected pipe needs to be serviced, the dequeue and reattach logic 312 will retrieve priority and bandwidth information corresponding to the selected pipe from the memory 304. Based on that information, the dequeue and reattach logic 312 may determine an appropriate memory address in the primary calendar 308 in which to reattach (i.e., rewrite) the selected pipe entry.

For example, similar to the reattaching of a pipe flow entry to the secondary calendar 310, if the selected pipe is of a high priority, the pipe is written into a memory address of the high priority portion of the primary calendar 308. Because the pipe was just serviced, the memory address selected in the high priority portion of the primary calendar 308 may be a greater distance from the memory address currently being checked in that portion of the calendar than when the pipe was initially attached (e.g., written to the primary calendar 308). Therefore, the pipe may have to wait a longer time to be serviced after it is reattached to the primary calendar 308 than when it is initially attached to the primary calendar 308.

Alternatively if the dequeue and reattach logic 312 determines that all pipe flows associated with this pipe are empty, the selected pipe will not be reattached to the primary calendar 308.

As mentioned above when describing step 416, upon receiving notification of a winning pipe, the dequeue and reattach logic 312 determines whether the pipe queue that corresponds to the winning pipe is empty. If the pipe queue that corresponds to the winning pipe is empty (i.e., the pipe queue has no pipe flow entries that need to be serviced during the time unit), the dequeue and reattach logic 312 may give the pipe queue corresponding to the selected pipe a credit (e.g., by setting a pipe credit bit for that pipe queue in the pipe queue table 314) during the time unit. However, no pipe or flow may be serviced during the time unit. Thereafter, step 410 may be performed.

A determination may be made during step 414, whether a pipe queue to which a winning pipe flow is written has a credit. If it is determined that the pipe queue to which the winning pipe flow is written does not have a win credit, step 412 may be performed in which the secondary calendar 310 is checked for another winning pipe flow. Alternatively, if it is determined that the pipe queue has a credit, for example, when a winning pipe flow entry is placed on the pipe queue in a subsequent time unit, the dequeue and reattach logic 312 is notified of this entry by the pipe queue table 314. The dequeue and reattach logic 312 will select the pipe flow entry from the pipe queue and will clear the pipe queue's win credit.

Once the dequeue and reattach logic 312 selects the pipe flow entry from the pipe queue, step 418 is performed. As stated above, if there is additional data for the selected pipe flow, the dequeue and reattach logic 312 determines additional data (e.g., frames or cells) identifying the selected pipe flow needs to be serviced. To make this determination the dequeue and reattach logic 312 will access the information stored in memory describing the structure of a queue. If additional data identifying the selected flow needs to be serviced, the dequeue and reattach logic 312 will retrieve priority and bandwidth information corresponding to that pipe flow from the memory 304. Based upon that information, the dequeue and reattach logic 312 may determine an appropriate memory address in the secondary calendar 310 in which to reattach (i.e., rewrite) the selected pipe flow entry so that the selected pipe flow may be scheduled to be serviced again. Alternatively, if the dequeue and reattach logic 312 determines that all data has been transmitted and the flow is empty, the selected pipe flow will not be reattached to the secondary calendar 310.

As described above, the dequeue and reattach logic 312 may determine whether the selected pipe is empty (i.e., no received data that needs to be serviced during this time unit identifies a pipe flow included in the selected pipe) by accessing information describing the structure of a queue for each pipe flow included in the selected pipe, which is stored in the memory 304. If additional data identifying a flow that is included in the selected pipe needs to be serviced, the dequeue and reattach logic 312 will retrieve priority and bandwidth information corresponding to the selected pipe from the memory 304. Based on that information, the dequeue and reattach logic 312 may determine an appropriate memory address in the primary calendar 308 in which to reattach (i.e., rewrite) the selected pipe entry. Alternatively if the dequeue and reattach logic 312 determines that all pipe flows associated with this pipe are empty, the selected pipe will not be reattached to the primary calendar 308.

Once the dequeue and reattach logic 312 clears the pipe queue's win credit, step 412 may be performed in which the secondary calendar 310 is checked for a winning pipe flow.

The foregoing description discloses only exemplary embodiments of the invention. Modifications of the above disclosed apparatus and method which fall within the scope of the invention will be readily apparent to those of ordinary skill in the art. Although in the above embodiments, each pipe is included in a plurality of pipe flows, in other embodiments, one or more of the pipes will include a plurality of pipe flows. Although in the above embodiments, autonomous flows, pipes and/or pipe flows were selected to be serviced based on a QoS parameter such as bandwidth or priority, in other embodiments, another QoS parameter may be used to select an autonomous flow, pipe, or pipe flow for servicing. Further, in one or more embodiments, steps 410 and 412 may be performed concurrently.

Accordingly, while the present invention has been disclosed in connection with exemplary embodiments thereof, it should be understood that other embodiments may fall within the spirit and scope of the invention, as defined by the following claims.

The invention claimed is:

1. A method of hierarchical scheduling comprising:
   receiving, by a network processor, data from one or more pipes, each pipe including a plurality of pipe flows;
   writing, by the network processor, data regarding the one or more pipes to one or more calendars;
   selecting, by the network processor, a winning pipe from the one or more pipes from which to transmit data based upon one or more quality of service parameters corresponding to the winning pipe;
   selecting, by the network processor, a winning pipe flow from the plurality of pipe flows included in the winning pipe based upon one or more quality of service parameters corresponding to the winning pipe flow; and
   transmitting, by the network processor, data from the winning pipe flow using a bandwidth corresponding to the winning pipe flow.

2. The method of claim 1 wherein selecting a winning pipe from the one or more pipes from which to transmit data based upon one or more quality of service parameters corresponding to the winning pipe includes writing data identifying a pipe to a memory address in a group of memory addresses based upon one or more quality of service parameters corresponding to the pipe and scanning the group of memory addresses to find data identifying a pipe.

3. The method of claim 2 further comprising rewriting data identifying the winning pipe to a memory address in a group of memory addresses based upon one or more quality of service parameters corresponding to the winning pipe.

4. The method of claim 1 wherein selecting a winning pipe flow from the plurality of pipe flows included in the winning pipe, based upon one or more quality of service parameters corresponding to the winning pipe flow, includes:
   writing data identifying a pipe flow to a memory address in a group of memory addresses based upon one or more quality of service parameters corresponding to the pipe flow;
   scanning the group of memory addresses to find data identifying a pipe flow;

writing the identified pipe flow in a queue corresponding to the winning pipe based upon one or more quality of service parameters corresponding to the winning pipe flow; and selecting the identified pipe flow from the queue corresponding to the winning pipe.

5. The method of claim 4 further comprising writing data identifying the winning pipe flow to a memory address in a group of memory addresses, based upon one or more quality of service parameters corresponding to the winning pipe flow.

6. A method for hierarchical scheduling comprising:
receiving, by a network processor, data identifying a pipe flow, the pipe flow included in a pipe;
writing, by the network processor, data regarding the pipe to a first calendar;
writing, by the network processor, data regarding the pipe flow to a second calendar;
scanning, by the network processor, the first calendar for a winning pipe;
scanning, by the network processor, the second calendar for a winning pipe flow;
writing, by the network processor, the winning pipe flow to a corresponding pipe queue;
using, by the network processor, the winning pipe to select a pipe flow from a corresponding pipe queue; and
transmitting, by the network processor, data from the selected pipe flow.

7. The method of claim 6 further comprising rewriting data regarding the winning pipe flow to the second calendar.

8. The method of claim 6 further comprising rewriting data regarding the winning pipe to the first calendar.

9. A network processor comprising:
at least one memory adapted to store one or more quality of service parameters corresponding to one or more pipes and pipe flows; and
scheduler logic, coupled to the at least one memory, adapted to:
receive data from one or more pipes, each pipe including a plurality of pipe flows;
select a winning pipe from the one or more pipes from which to transmit data based upon one or more quality of service parameters corresponding to the winning pipe;
select a pipe flow from the plurality of pipe flows included in the winning pipe based upon one or more quality of service parameters corresponding to the selected pipe flow; and
transmit data from the selected pipe flow;
wherein the scheduler logic comprises:
a primary calendar for storing at least one of an autonomous flows and a pipe that are scheduled to be serviced;
a secondary calendar for storing pipe flows that are scheduled to be serviced; and
a pipe queue table for storing a winning pipe flow in a queue for a pipe to which the pipe flow corresponds.

10. The network processor of claim 9 wherein the scheduler logic further comprises:
enqueue and new attach logic for scheduling at least one of an autonomous flow and a pipe flow to be serviced; and
dequeue and reattach logic for selecting at least one of an autonomous flow and a pipe flow to be serviced.

11. The network processor of claim 9 wherein the scheduler logic is further adapted to transmit data from the selected pipe flow using a bandwidth corresponding to the winning pipe flow.

12. The network processor of claim 9 wherein the scheduler logic is further adapted to write data identifying a pipe to a memory address in a group of memory addresses based upon one or more quality of service parameters corresponding to the pipe and scanning the group of memory addresses to find data identifying a pipe.

13. The network processor of claim 12 wherein the scheduler logic is further adapted to rewrite data identifying the winning pipe to a memory address in a group of memory addresses based upon one or more quality of service parameters corresponding to the winning pipe.

14. The network processor of claim 9 wherein the scheduler logic is further adapted to:
write data identifying a pipe flow to a memory address in a group of memory addresses based upon one or more quality of service parameters corresponding to the pipe flow;
scan the group of memory addresses to find data identifying a pipe flow;
write the identified pipe flow in a queue corresponding to the winning pipe based upon one or more quality of service parameters corresponding to the selected pipe flow; and
select the identified pipe flow from the queue corresponding to the winning pipe.

15. The network processor of claim 14 wherein the scheduler logic is further adapted to write data identifying the selected pipe flow to a memory address in a group of memory addresses, based upon one or more quality of service parameters corresponding to the selected pipe flow.

16. A network processor comprising:
at least one memory adapted to store one or more quality of service parameters corresponding to one or more pipes and pipe flows; and
scheduler logic comprising a first calendar and a second calendar, coupled to the at least one memory and adapted to:
receive data identifying a pipe flow, the pipe flow included in a pipe;
write data regarding the pipe to the first calendar;
write data regarding the pipe flow to the second calendar;
scan the first calendar for a winning pipe;
scan the second calendar for a winning pipe flow;
write the winning pipe flow to a corresponding pipe queue;
use the winning pipe to select a pipe flow from a corresponding pipe queue; and
transmit data from the selected pipe flow.

17. The network processor of claim 16 wherein the scheduler logic further comprises: a pipe queue table for storing a winning pipe flow in a queue for a pipe to which the pipe flow corresponds;
an enqueue and new attach logic for scheduling at least one of an autonomous flow and a pipe flows to be serviced; and
a dequeue and reattach logic for selecting at least one of an autonomous flow and a pipe flow to be serviced.

18. The network processor of claim 16 wherein the scheduler logic is further adapted to rewrite data regarding the winning pipe flow to the second calendar.

19. The network processor of claim 16 wherein the scheduler logic is further adapted to rewrite data regarding the winning pipe to the first calendar.

* * * * *